United States Patent Office 3,206,440
Patented Sept. 14, 1965

3,206,440
VINYL ESTERS OF MALEIC ANHYDRIDE ADDUCTS
Glen W. Hedrick, Lake City, Fla., assignor to the United States of America as represented by the Secretary of Agriculture
No Drawing. Filed June 29, 1961, Ser. No. 120,793
11 Claims. (Cl. 260—78.5)
(Granted under Title 35, U.S. Code (1952), sec. 266)

A non-exclusive, irrevocable, royalty-free license in the invention herein described, through the world for all purposes of the United States Government with the power to grant sublicenses for such purposes, is hereby granted to the Government of the United States of America.

This invention relates to a new ester, the vinyl ester of maleopimaric acid (vinyl maleopimarate) and to the vinyl esters of certain structurally related compounds and to the polymeric derivatives of these vinyl esters. More particularly, this invention relates to the vinyl ester of maleopimaric acid and the vinyl ester of the hydrogenated maleic anhydride adduct of eleostearic acid. Each of the aforementioned vinyl esters will polymerize to form the homopolymer thereof and each of the aforementioned vinyl esters is capable of copolymerizing with other monomeric materials, such as vinyl acetate and vinyl chloride.

Maleopimaric acid is prepared from levopimaric acid, which acid is a constituent of gum oleoresin. Levopimaric acid is condensed with maleic anhydride to form a Diels-Alder addition compound, maleopimaric acid, which is 6,14-dihydrolevopimaric acid-6,14-endo-$\alpha,\beta$ succinic anhydride. The Diels-Alder addition product is known but the vinyl ester derivative of this compound has heretofore not been prepared.

According to this invention, maleopimaric acid is esterified by way of a vinyl ester interchange reaction to produce a compound which has valuable properties as an ingredient in copolymers for the production of vinyl type resins, vinyl acetate films and resinous copolymers with vinyl chloride and with vinyl acetate that are valuable as protective coating films.

Also, according to this invention, it has been found that compounds related structurally in certain respects to maleopimaric acid can be vinylated by way of vinyl ester interchange reactions to produce new vinyl esters which have utility in the same fields at those listed above for vinyl maleopimarate.

The parent acid compounds, the vinyl esters of which are the subject of this invention, are all characterized structurally by possessing an acid anhydride grouping in addition to a free carboxylic acid group. Because the anhydride is normally an extremely reactive grouping, it was surprising to discover that the vinyl esters of maleopimaric acid and hydrogenated maleinated eleostearic acid could be prepared, the esterification reaction taking place only at the single free carboxyl group and without affecting in any way the intact anhydride grouping.

The vinyl ester derivatives prepared according to processes of this invention were found to polymerize readily under the influence of free radical initiators (benzoyl peroxide, for example).

With specific reference to the vinyl ester of maleopimaric acid, it was found that the intact acid anhydride structure could be opened, using ethyl alcohol or cyclohexylamine to form in the case of ethyl alcohol a mixed ester wherein only one of the carboxyl groups of the opened anhydride ring was esterified with ethyl alcohol. In the case of cyclohexylamine, the anhydride group was opened and the cyclohexylamine salt of a cyclohexylamide was formed. In either case (the ethyl alcohol or the cyclohexylamine), the vinyl ester grouping was unaffected.

Esterification reactions involving the opened anhydride group could not be effected with alcohols other than ethyl alcohol since the vinyl ester grouping remote from the anhydride grouping proved to be more susceptible to transesterification than the carboxyl groups of the anhydride were to esterification. The following examples will describe in detail the preparation of the vinyl esters of maleopimaric acid, hydrogenated maleinated eleostearic acid, the homopolymers of these two vinyl esters and the copolymers of these two vinyl esters with vinyl acetate and with vinyl chloride.

EXAMPLE 1

*Vinyl maleopimarate*

The condensation product of maleic anhydride and levopimaric acid, which compound is 6,14-dihydrolevopimaric acid-6,14-endo-$\alpha,\beta$ succinic anhydride was allowed to react with an excess of vinyl acetate. The molar ratio of the reactants was 0.5 mole (200 grams) of the acid and 9.5 moles (880 ml.) of vinyl acetate. The reaction was carried out in the presence of a mercuric sulfate-sulfuric acid catalyst at 20° C. and with vigorous agitation. It is essential that the temperature be kept low in order to prevent the occurence of unwanted side reactions and in no case should the temperature be allowed to exceed 30° C. It is likewise essential that the meruric sulfate catalyst be present in the reaction mixture along with a strong acid. Mercuric sulfate catalyst is best prepared in situ by adding mercuric acetate to the reaction mixture in the amount of approximately 2% by weight based on the weight of the acid followed by the addition of concentrated sulfuric acid in the amount of approximately 0.5% by weight based on the weight of the acid. After about four hours of agitation, the maleopimaric acid went into solution and the colorless crystal vinyl esters started to precipitate. Progress of the vinyl interchange reaction was followed by removing small aliquots from the reaction mixture, washing the aliquots with water and titrating same with standard alkali solution. After standing at room temperature for 48 hours, 3% by weight of sodium acetate was added to terminate the reaction. A yield of 60% by weight of the ester was obtained by filtering the reaction mixture at this point. As an alternative isolation procedure, excess vinyl acetate was removed by vacuum stripping and the residue was treated with charcoal in 600 ml. of acetone for the purpose of decolorizing the product. The acetone solution was filtered to remove the charcoal and then cooled. The ester product crystallized from the acetone in the form of colorless plates. The solid ester product was isolated by filtration and several crops of crystals were obtained by stepwise concentration of the acetone solution. Recrystallization of the several crops of crystals from acetone resulted in an 88% by weight yield of the ester product. The melting point of the vinyl ester product was 164 to 165.5° C. $[\alpha]_D^{24}$ —37.6 (5% in chloroform).

*Analysis.*—Calcd. for $C_{26}H_{34}O_5$: C, 73.21; H, 8.04; hydrogenation equiv., 426.5; neut. equiv., 213.3 (in acetone), 426.5 (in ethanol). Found: C, 73.19; H, 8.19; hydrogenation equiv. (5% palladium on carbon in acetic acid), 431; neut. equiv., 213.2 (in acetone), 426.0 (in ethanol).

The vinyl ester product was further characterized by reduction in glacial acetic acid using palladium on carbon as the hydrogenation catalyst. The reduced hydrogenated) product was identical with ethyl maleopimarate.

EXAMPLE 2

*The reaction product of vinyl maleopimarate and ethyl alcohol*

An ethyl alcohol solution of vinyl maleopimarate was refluxed for one hour in the presence of an equimolar amount of an anhydrous sodium carbonate. Following reflux and filtration to remove the excess sodium bicarbonate, the crystalline sodium salt was obtained. Titration of a solution of the salt with standard acid to a phenol red end-point and subsequent extraction of the acidified product with ether gave a quantitative yield of a product with a neutral equivalent of 472.6, a hydrogenated equivalent of 472.6, carbon 71.86; hydrogen 8.36. These analysis characteristics indicate a compound related to vinyl maleopimarate wherein the maleic acid anhydride ring has been opened and a single carboxyl group esterified with ethyl alcohol. For $C_{28}H_{40}O_6$, C is 71.16, H is 8.53, neutral equivalent is 472.6. This compound heated at 110° C. was found to revert back to vinyl maleopimarate. The half ethyl ester can also be made in 70% yield by merely refluxing vinyl maleopimarate in ethyl alcohol. It was impossible to prepare other alkyl esters such as the n-butyl ester or the octadecanol ester, for example, since it was apparent that transesterification of the vinyl group took place before esterification of the carboxylic acid groups of the maleic acid anhydride portion of the molecule.

EXAMPLE 3

*Polymerization of vinyl maleopimarate*

Homopolymerization and copolymerizations of vinyl maleopimarate with vinyl acetate and with vinyl chloride were carried out in 16 oz. bottles, sealed with gaskets. The vinyl acetate copolymers were heated without agitation on a steam bath and the vinyl chloride copolymers were prepared in a constant temperature bath. In each case, the copolymers were isolated by pouring the reaction mixture into a large volume of ether, and reprecipitating the polymer from benzene in the case of the vinyl acetate copolymer or tetrahydrofuran with pentane in the case of the vinyl chloride copolymer. Copolymers of vinyl maleopimarate with vinyl acetate were soluble, colorless resins that exhibited good film forming properties on glass and on metal surfaces. Brittleness and melting point of the copolymers increases and intrinsic viscosity decreases as the amount of vinyl maleopimarate in the copolymer increases.

EXAMPLE 4

*The vinyl ester of hydrogenated maleinated eleostearic acid*

Hydrogenated maleinated eleostearic acid as prepared according to Bickford et al. (Journal of American Chemical Society, vol. 30, p. 376), was reacted with an excess of vinyl acetate using mercuric sulfate-sulfuric acid as a catalyst. The reaction mixture consisted of approximately ½ mole of the acid and 9½ moles of the vinyl acetate together with 2% by weight of the catalyst. The vinyl interchange reaction was carried out in precisely the same manner as described in Example 1 and the vinylated product after reaction was isolated by vacuum stripping to remove excess vinyl acetate, dissolving the stripped residue in ether followed by water-washing, drying, and subsequent removal of ether by volatilization. The vinyl ester crystallized from aqueous methanol exhibited the following characteristics. Melting point 39–40° C.; hydrogenation equivalent, 404.2; neutral equivalent in ethanol, 404. The calculated hydrogenation equivalent and neutral equivalent for the vinyl ester of hydrogenated maleinated eleostearic acid is 406. Homopolymers of the vinyl ester and copolymers of the vinyl ester with vinyl acetate and with vinyl chloride were prepared in the same manner as described in Example 3. The vinyl acetate copolymers were soluble in ethyl acetate and in benzene, but were insoluble in hexane. The melting point of typical copolymers varied between the limits of 96 and 100° C., the melting point increasing as the amount of the vinyl ester in the copolymer was increased. The molecular weight in benzene of a copolymer containing approximately 8% by weight of the vinyl ester of hydrogenated maleinated eleostearic acid was 4,183 measured in benzene. The vinyl chloride copolymers were soluble in tetrahydrofurane and in ethyl acetate but were only sparingly soluble in benzene. A copolymer containing 47.5% chlorine exhibited a melting point of 115 to 120° C. A copolymer containing this percentage of chlorine is composed of approximately 16% by weight of the vinyl ester. The copolymer of this compound with both vinyl acetate and vinyl chloride are valuable compounds for use as protective coatings. They exhibit in particular when applied to surfaces such as glass and smooth metal the adhesion tenacity which is a characteristic of some other eleostearic acid containing coating compounds.

I claim:
1. The vinyl ester of maleopimaric acid.
2. The vinyl ester of hydrogenated maleinated eleostearic acid.
3. The homopolymer of the vinyl ester of maleopimaric acid.
4. The homopolymer of the vinyl ester of hydrogenated maleinated eleostearic acid.
5. The copolymer of the vinyl ester of maleopimaric acid with vinyl acetate.
6. The copolymer of the vinyl ester of maleopimaric acid with vinyl chloride.
7. The copolymer of the vinyl ester of hydrogenated maleinated eleostearic acid with vinyl acetate.
8. The copolymer of the vinyl ester of hydrogenated maleinated eleostearic acid with vinyl chloride.
9. A compound selected from the group consisting of the vinyl ester of maleopimaric acid and the vinyl ester of hydrogenated maleinated eleostearic acid.
10. A homopolymer selected from the group consisting of the homopolymer of the vinyl ester of maleopimaric acid and the homopolymer of the vinyl ester of hydrogenated maleinated eleostearic acid.
11. A copolymer of a member selected from the group consisting of vinyl chloride and vinyl acetate and a member selected from the group consisting of the vinyl ester of maleopimaric acid and the vinyl ester of hydrogenated maleinated eleostearic acid.

References Cited by the Examiner

UNITED STATES PATENTS

| 2,299,862 | 10/42 | Toussaint et al. | 260—476 |
| 2,359,980 | 10/44 | Fleck | 260—346.6 |
| 2,458,772 | 1/49 | Fleck | 260—26 |
| 2,502,645 | 4/50 | Elwell | 260—78.4 |
| 2,512,410 | 6/50 | Adelson et al. | 260—78.4 |
| 2,520,959 | 9/50 | Powers | 260—86.3 |
| 2,656,343 | 10/53 | Ritchie | 260—103 |
| 2,727,871 | 12/55 | Ropp | 260—103 |
| 2,727,873 | 12/55 | Ropp | 260—27 |
| 2,736,715 | 2/58 | Brunner | 260—23 |
| 2,865,931 | 12/58 | Mack et al. | 260—346.3 |
| 3,063,969 | 11/62 | Stephens et al. | 260—78.4 |

OTHER REFERENCES

Lloyd et al.: Journal of Organic Chemistry, vol. 26, pp. 2029–32 (1961).

Swern et al.: Journal of the American Chemical Society, vol. 70 (July 1948), pages 2334–2339.

LEON J. BERCOVITZ, *Primary Examiner.*

MILTON STERMAN, DONALD E. CZAJA, *Examiners.*